United States Patent [19]

Ball et al.

[11] 4,034,784

[45] July 12, 1977

[54] FILLER NECK TO INHIBIT USE OF LEADED FUEL

[75] Inventors: Frank W. Ball; Paul R. Mutty, both of Lansing, Mich.

[73] Assignee: General Motors Corporation, Detroit, Mich.

[21] Appl. No.: 573,903

[22] Filed: May 2, 1975

Related U.S. Application Data

[63] Continuation of Ser. No. 497,339, Aug. 14, 1974, abandoned.

[51] Int. Cl.² ............................................ B65D 29/02
[52] U.S. Cl. ............................ 141/348; 220/86 R; 251/149.2
[58] Field of Search .................. 291/149.2, 339; 137/351, 592, 588; 220/35, 36, 86 R, 86 AT; 141/286, 331, 335, 344, 348, 349, 350, 351

[56] References Cited

U.S. PATENT DOCUMENTS

| | | | |
|---|---|---|---|
| 3,730,216 | 5/1973 | Arnett | 220/86 R |
| 3,835,900 | 9/1974 | Godbier | 220/86 R |
| 3,845,877 | 11/1974 | Arnett | 220/86 R |
| 3,880,317 | 4/1975 | Arnett | 220/86 R |

*Primary Examiner*—Houston S. Bell, Jr.
*Attorney, Agent, or Firm*—C. K. Veenstra

[57] ABSTRACT

A fuel deflector and restrictor are disposed in the filler neck of an automobile fuel tank to inhibit filling of the tank with improper fuel. An opening in the restrictor permits insertion of and delivery from a fuel nozzle used with non-leaded fuels, but the restrictor obstructs a larger diameter nozzle used with leaded fuels. A resilient deflector member is cantilevered at one end and is biased toward and partly underlies the acceptance opening. The deflector is moved by the smaller diameter non-leaded fuel nozzle upon insertion, but deflects fuel impinging thereon from the unaccepted leaded fuel nozzle through an aperture in the restrictor to actuate the automatic shut-off mechanism of the leaded fuel nozzle.

4 Claims, 5 Drawing Figures

FILLER NECK TO INHIBIT USE OF LEADED FUEL

This is a continuation of Ser. No. 497,339, filed Aug. 14, 1974, and now abandoned.

This invention relates to a filler neck which inhibits filling of a fuel tank with undesirable leaded fuel delivered from a large diameter nozzle but permits filling of the fuel tank with non-leaded fuel delivered from a small diameter nozzle and, more specifically, relates to such a filler neck having a deflector which causes fuel from the large diameter nozzle to actuate an automatic nozzle shut-off.

It is generally understood that the use of leaded fuels reduces or eliminates the effectiveness of catalytic converters which are used to treat exhaust gases of internal combustion engines. For protection of such converters it is desirable to provide reliable means to permit easy refueling with non-leaded fuels and to inhibit refueling with leaded fuels. To accomplish this, it is desirable during refueling to quickly energize the automatic shut-off mechanism of the leaded fuel nozzle and thus quickly curtail fuel flow therefrom. This would inhibit filling of the fuel tank with leaded fuels thereby prolonging catalyst effectiveness. In this regard, standards have been proposed that mandate shutting off leaded fuel flow before, at most, 700 cubic centimeters of fuel have been delivered.

Other standards have been proposed for automobile service station pumps to have smaller diameter nozzles (not greater than 0.85 inch) for non-leaded fuels and larger diameter pump nozzles for leaded fuels (not less than 0.93 inch). In accordance with those standards and with the before-mentioned quick shut-off proposal, this invention provides a filler neck having a restrictor which readily accepts the smaller diameter nozzles and obstructs the larger diameter nozzles. Also, this invention provides a filler neck which includes means for deflecting fuel from the obstructed nozzle toward a signal port included in the automatic shut-off mechanism of the nozzle. When the signal port is covered by the deflected fuel, the mechanism quickly shuts off fuel flow from the nozzle thereby preventing entry of substantial, deleterious quantities of leaded fuel to the tank. Finally, this invention also provides a construction which is simple and reliable plus effective in its operation.

A filler neck constructed in accordance with this invention includes a cup-shaped insert opening away from or concave from the tank and forming a restrictor having an opening in the bottom to receive or accept nozzles less than or equal to a selected diameter but not nozzles having diameters greater than the selected diameter thereby providing simple yet reliable means for accepting only designated fuel nozzles and non-leaded fuels supplied therefrom. A resilient steel deflector is cantilivered downstream of said opening and biased toward said opening to underlie at least a portion thereof.

When filling is attempted using non-leaded fuel, the opening permits insertion of the fuel nozzle therethrough. The spring steel deflector is easily moved out of the way by the accepted nozzle to permit rapid filling of the tank with non-leaded fuel.

However, when filling is attempted from the leaded fuel nozzle, a portion of the fuel is intercepted and impinges on the deflector and is deflected or diverted laterally and upwardly through a pair of apertures in the restrictor toward a signal port in the nozzle. The signal port normally bleeds an atmospheric pressure signal to a vacuum-operated mechanism in the nozzle for shutting off fuel flow. By interrupting that pressure signal the deflected fuel actuates the vacuum-operated shut-off mechanism to prevent entry of appreciable quantities of leaded fuel.

In order to better appreciate the invention the remainder of the specification should be referred to, with reference being made to the drawings wherein.

Figure 1:
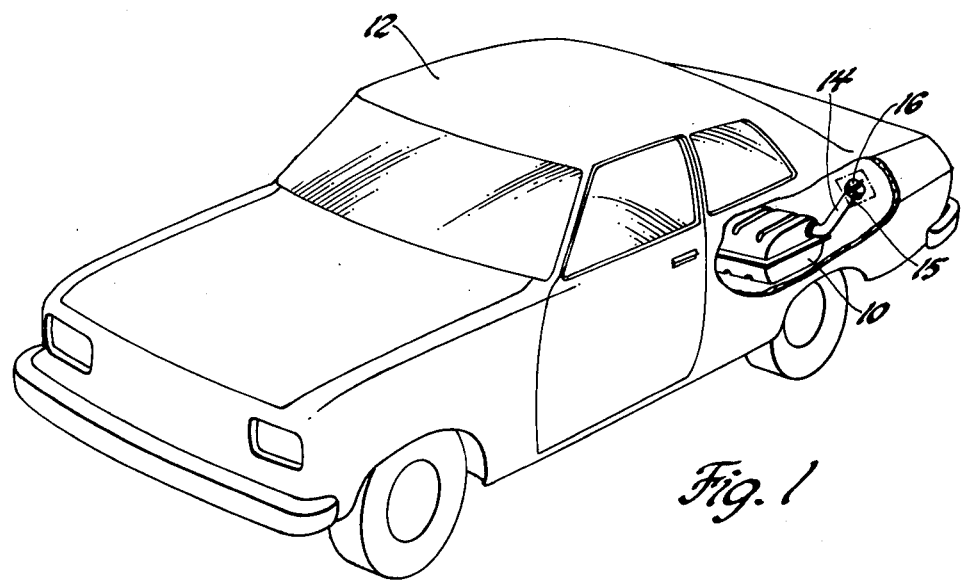
FIG. 1 is a view of a motor vehicle with parts broken away to show the fuel tank and filler neck installation.

Referring to FIG. 1, a fuel tank 10 is conventionally installed in a motor vehicle 12. Tank 10 has an inlet formed by an outwardly and upwardly extending filler neck 14 which has its outermost and uppermost end 15 closed by a threaded cap 16.

FIGS. 2–5 of the drawings illustrate the details of filler neck 14. A cup-shaped insert 20, concave from tank 10 and residing within end 15 of filler neck 14, has a side wall 22 terminating in an outwardly extending flange 24 overlapping end 15. Insert 20 may be pressed into and flange 24 may be soldered to end 15 to secure restrictor 20 thereto.

Side wall 22 is formed with a thread 26 for engaging and securing threaded cap 16.

Figure 4:
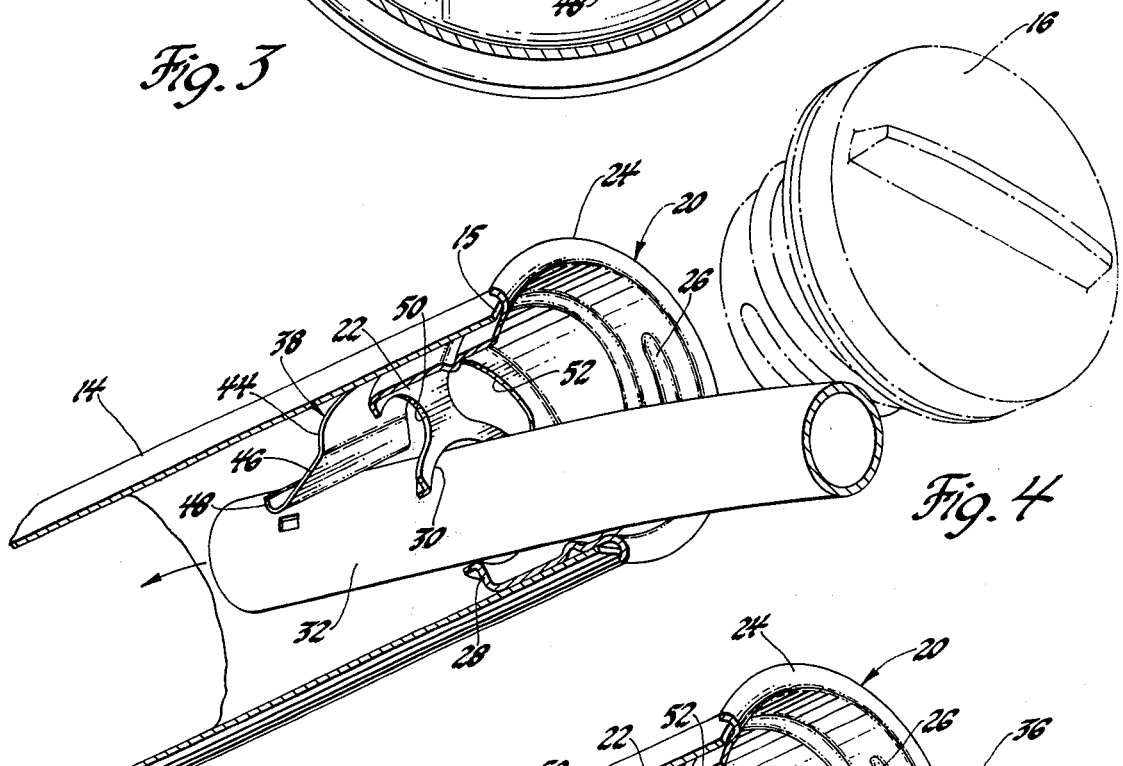
FIGS. 4 and 5 are views of the present invention showing, respectively, refueling with a non-leaded fuel nozzle and attempted refueling with a leaded fuel nozzle.
Figure 5:
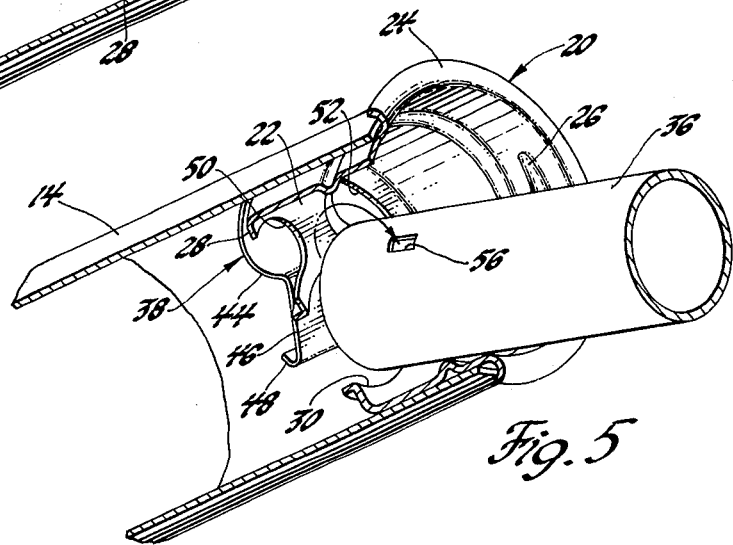

The bottom wall 28 of insert 20 forms a restrictor recessed in and extending across the end 15 of filler neck 14 and having an opening 30, the diameter D of which accepts small nozzles, such as nozzle 32 in FIG. 4, but not large nozzles, such as nozzle 36 in FIG. 5.

Figure 2:
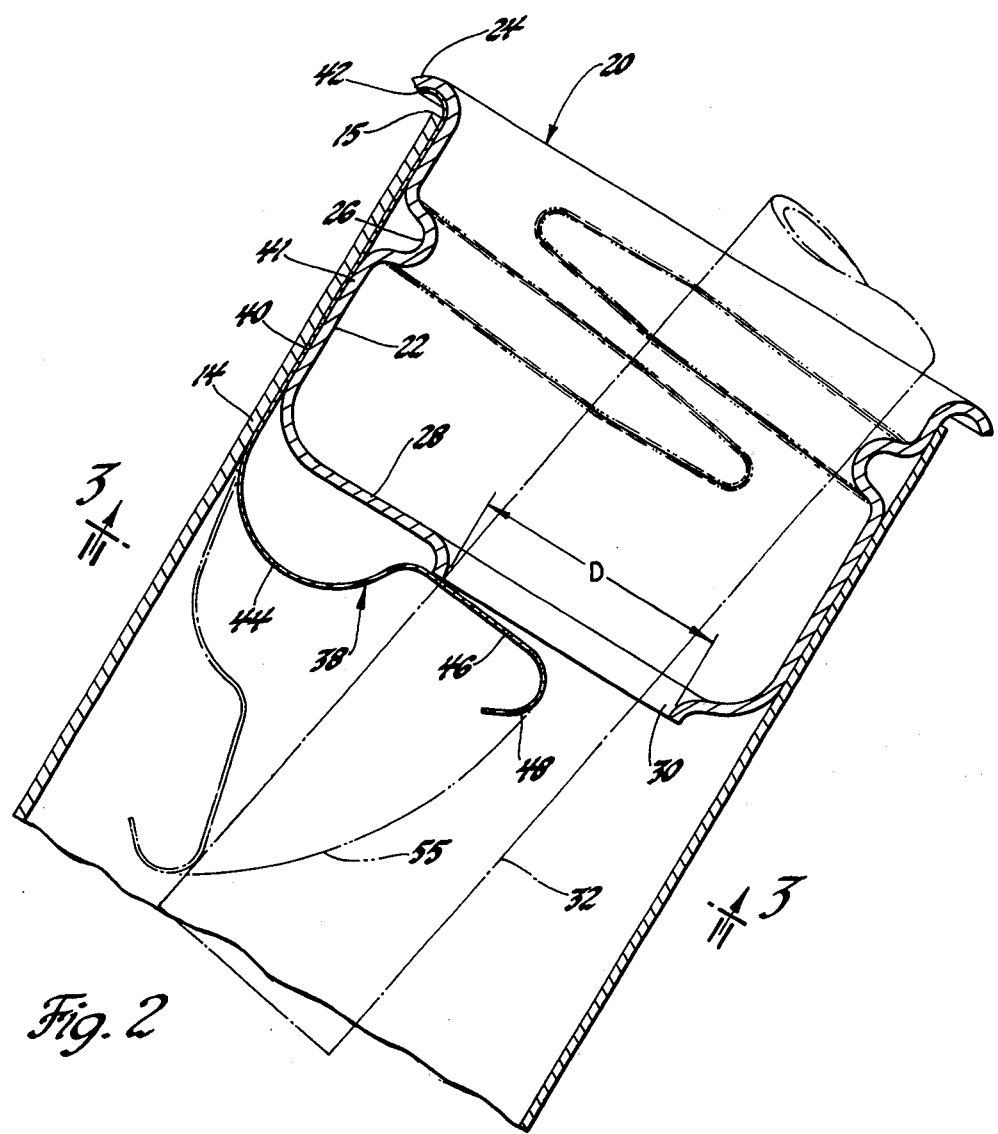
FIG. 2 is a sectional view of the top of the filler neck showing the present invention.
Figure 3:
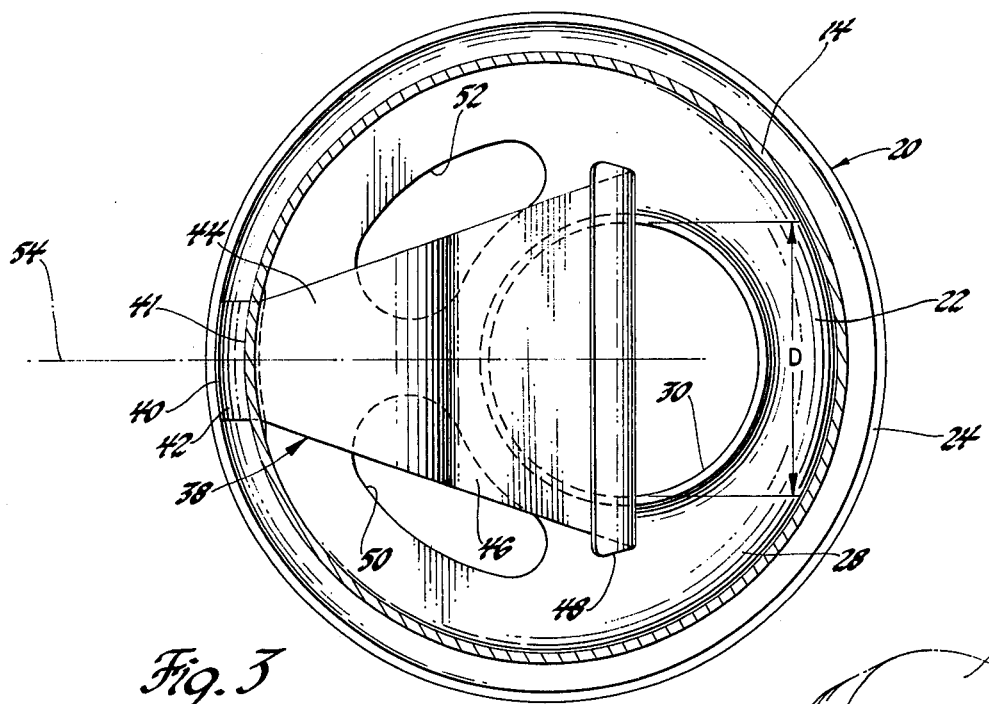
FIG. 3 is a sectional view of the filler neck taken along line 3—3 of FIG. 2 showing the disposition of the deflector.

As best shown in FIGS. 2 and 3, a tapered deflector 38 comprises a narrow portion 40 which conforms with portion 41 of side wall 22. As shown, portion 40 is clamped within the end 15 of filler neck 14 by side wall 22 and held in part by an overlapped end 42. Deflector 38 further comprises a circularly curved cantilever portion 44 which widens into a flat portion 46 terminating in a curled end 48. Deflector 38 is formed of a resilient spring steel and is inherently biased toward opening 30 as shown in FIG. 2 so that portion 46 underlies a substantial part of opening 30.

Deflector 38 also underlies portions of a pair of kidney-shaped apertures 50, 52 symmetrically disposed on opposite sides of center line 54. The inner boundaries of apertures 50, 52 are concentric with opening 30 while their outer boundaries are concentric with side wall 22; thus curved portion 44 of deflector 38 underlies the widest portions of apertures 50, 52. It is important to note that curved portion 44 is constructed to ensure flexure and movement of deflector 38 either by insertion of the selected nozzle 32 or by substantial impingement of fuel thereon from the unadmitted nozzle 36.

Referring now to FIG. 4, when nozzle 32 is inserted through opening 30, it slides on curled end 48 and moves deflector 38 to the position shown. (Note that flat portion 46 of deflector 38 follows an arcuate path 55 shown in FIG. 2 as curved portion 44 unwinds or straightens during the insertion of nozzle 32). This permits unrestricted filling of the fuel tank with, for example, non-leaded fuel. During such rapid filling with nonleaded fuel, air may be displaced from fuel tank 10 through apertures 50, 52.

If filling is attempted using nozzle 36 as in FIG. 5, bottom wall 28 obstructs nozzle 36 and fuel impinging on flat portion 46 causes deflector 38 to flex downwardly. The fuel is then diverted along curved portion 44 and deflected back through apertures 50, 52 toward nozzle 36 thus causing the automatic shut-off signal port 56 thereof to be covered with fuel.

As is well known, port 56 provides an atmospheric pressure signal to a vacuum operated automatic shut-off mechanism (not shown) of the pump nozzle. The atmospheric pressure signal is lost when port 56 is covered with fuel, and the mechanism is quickly actuated to curtail fuel flow. Thus, it can be seen that delivery of leaded fuel from a larger diameter fuel nozzle is substantially and quickly inhibited by provision of the combination of restrictor 28 with its opening 30 and apertures 50, 52 and deflector 38 cooperating therewith.

It will be appreciated that flat portion 46 of deflector member 38 does not seal or even necessarily cover all of the area of opening 30 and/or apertures 50 and 52, thereby deflecting only the amount of fuel required to quickly cover port 56.

The embodiments of the invention in which an exclusive property or privilege is claimed are defined as follows:

1. A fuel tank filler neck adapted to inhibit filling of a fuel tank by a leaded fuel nozzle and to permit filling of the fuel tank by an unleaded fuel nozzle, said leaded fuel nozzle having a diameter larger than the diameter of said unleaded fuel nozzle and further having a shut-off mechanism including a signal port, said mechanism being actuated to shut-off fuel flow when said signal port is covered by fuel, said filler neck comprising a restrictor recessed in and extending across the end of said filler neck, said restrictor having an opening with a diameter larger than the diameter of said unleaded fuel nozzle and smaller than the diameter of said leaded fuel nozzle to thereby permit insertion of said unleaded fuel nozzle through said restrictor and to obstruct insertion of said leaded fuel nozzle, said restrictor further having at least one aperture, and a deflector including a flat portion underlying at least a portion of said opening and a curved portion underlying at least a portion of said aperture, said deflector being displaceable by said unleaded fuel nozzle to admit fuel therefrom, said flat portion of said deflector intercepting fuel from said leaded fuel nozzle and diverting such fuel to said curved portion of said deflector which deflects such fuel through said aperture toward said signal port to actuate said mechanism and shut off fuel flow from said leaded fuel nozzle.

2. A fuel tank filler neck adapted to inhibit filling of a fuel tank by a leaded fuel nozzle and to permit filling of the fuel tank by an unleaded fuel nozzle, said leaded fuel nozzle having a diameter larger than the diameter of said unleaded fuel nozzle and further having a shut-off mechanism including a signal port, said mechanism being actuated to shut off fuel flow when said signal port is covered by fuel, said filler neck comprising a cup-shaped restrictor having a cylindrical side wall terminating in a bottom wall recessed in and extending across the end of said filler neck, said bottom wall having an opening with a diameter larger than the diameter of said unleaded fuel nozzle and smaller than the diameter of said leaded fuel nozzle to thereby permit insertion of said unleaded fuel nozzle through said restrictor and to obstruct insertion of said leaded fuel nozzle, said bottom wall further having a pair of apertures adjacent said opening, each of said apertures having an inner boundary concentric with said opening and an outer boundary concentric with said side wall, and a resilient deflector including a secured end mounted adjacent said side wall, a curved portion underlying at least a portion of each of said apertures, a flat portion underlying at least a portion of said opening, and a free end disposed adjacent said opening, said curved portion being concave toward said apertures, said deflector tapering from a narrow portion near said secured end to a wider portion beneath said apertures and a widest portion beneath said opening, said deflector being displaceable by said unleaded fuel nozzle to admit fuel therefrom and said free end of said deflector being curled to facilitate sliding of said unleaded fuel nozzle on said deflector, said flat portion of said deflector intercepting fuel from said leaded fuel nozzle and diverting such fuel to said curved portion of said deflector which deflects such fuel through said apertures toward said signal port to actuate said mechanism and shut off fuel flow from said leaded fuel nozzle.

3. A fuel tank filler neck adapted to inhibit filling of a fuel tank by a leaded fuel nozzle and to permit filling of the fuel tank by an unleaded fuel nozzle, said leaded fuel nozzle having a diameter larger than the diameter of said unleaded fuel nozzle and further having a shut-off mechanism including a signal port, said mechanism being actuated to shut-off fuel flow when said signal port is covered by fuel, said filler neck comprising a restrictor recessed in and extending across the end of said filler neck, said restrictor having an opening with a diameter larger than the diameter of said unleaded fuel nozzle and smaller than the diameter of said leaded fuel nozzle to thereby permit insertion of said unleaded fuel nozzle through said restrictor and to obstruct insertion of said leaded fuel nozzle, said restrictor further having at least one aperture disposed in a plane substantially parallel to and closely adjacent the plane of said opening, and a deflector underlying at least a portion of said opening, said deflector being displaceable by said unleaded fuel nozzle to admit fuel therefrom, said deflector intercepting fuel from said leaded fuel nozzle and deflecting such fuel through said aperture toward said signal port to actuate said mechanism and shut off fuel flow from said leaded fuel nozzle.

4. A fuel tank filler neck adapted to inhibit filling of a fuel tank by a leaded fuel nozzle and to permit filling of the fuel tank by an unleaded fuel nozzle, said leaded fuel nozzle having a diameter larger than the diameter of said unleaded fuel nozzle and further having a shut-off mechanism including a signal port, said mechanism being actuated to shut-off fuel flow when said signal port is covered by fuel, said filler neck comprising a restricto r recessed in and extending across the end of said filler neck, said restrictor having an opening with a diameter larger than the diameter of said unleaded fuel nozzle and smaller than the diameter of said leaded fuel nozzle to thereby permit insertion of said unleaded fuel nozzle through said restrictor and to obstruct insertion of said leaded fuel nozzle, said restrictor further having at least one aperture disposed in a plane substantially parallel to and closely adjacent the plane of said opening, and a deflector underlying at least a portion of said opening and at least a portion of said aperture, said deflector being displaceable by said unleaded fuel nozzle to admit fuel therefrom, said deflector intercepting fuel from said leaded fuel nozzle and deflecting such fuel through said aperture toward said signal port to actuate said mechanism and shut off fuel flow from said leaded fuel nozzle.

* * * * *

UNITED STATES PATENT OFFICE
CERTIFICATE OF CORRECTION

Patent No. 4,034,784          Dated  July 12, 1977

Inventor(s)   Frank W. Ball et al.

It is certified that error appears in the above-identified patent and that said Letters Patent are hereby corrected as shown below:

In the Grant Only, Insert Columns 5 and 6, as part of Letters Patent.

*Signed and Sealed this*

*Fifteenth* Day of *November 1977*

[SEAL]

Attest:

RUTH C. MASON  
*Attesting Officer*

LUTRELLE F. PARKER  
*Acting Commissioner of Patents and Trademarks* ing, and a deflector underlying at least a portion of said opening, and at least a portion of said aperture, said deflector being displaceable by said unleaded fuel nozzle to admit fuel therefrom, said deflector intercepting fuel from said leaded fuel nozzle and deflecting such fuel through said aperture toward said signal port to actuate said mechanism and shut off fuel flow from said leaded fuel nozzle.

* * * * *